US011258218B2

(12) United States Patent
Uemura et al.

(10) Patent No.: US 11,258,218 B2
(45) Date of Patent: Feb. 22, 2022

(54) BATTERY CONNECTOR ASSEMBLY AND BATTERY DEVICE

(71) Applicant: Kubota Corporation, Osaka (JP)

(72) Inventors: Katsuhiko Uemura, Sakai (JP); Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 164 days.

(21) Appl. No.: 16/434,331

(22) Filed: Jun. 7, 2019

(65) Prior Publication Data

US 2020/0044401 A1 Feb. 6, 2020

(30) Foreign Application Priority Data

Aug. 2, 2018 (JP) .............................. JP2018-145739

(51) Int. Cl.
*H01R 27/02* (2006.01)
*H01R 13/52* (2006.01)
*H01R 13/66* (2006.01)
*H01M 50/50* (2021.01)

(52) U.S. Cl.
CPC ............ *H01R 27/02* (2013.01); *H01M 50/50* (2021.01); *H01R 13/5213* (2013.01); *H01R 13/6691* (2013.01); *H01M 2220/20* (2013.01); *H01R 2201/26* (2013.01)

(58) Field of Classification Search
CPC ........ H01R 31/06; H01R 33/92; H01R 27/02; H01R 13/5213; H01R 13/6691; H01R 2201/26; H01M 50/50; H01M 2220/20

USPC ............................ 439/638, 639, 135, 34, 35
See application file for complete search history.

(56) References Cited

U.S. PATENT DOCUMENTS

| | | | |
|---|---|---|---|
| 8,097,359 B2 * | 1/2012 | Gau ..................... | H01M 50/256 429/187 |
| 8,162,072 B2 * | 4/2012 | Marcil ................. | A01B 33/028 172/42 |
| 8,429,885 B2 | 4/2013 | Rosa et al. | |
| 8,454,375 B2 * | 6/2013 | Bauer ................ | H01R 13/6397 439/135 |
| 8,653,786 B2 | 2/2014 | Baetica et al. | |
| 2004/0207364 A1 | 10/2004 | Uguzzoni et al. | |

(Continued)

FOREIGN PATENT DOCUMENTS

| | | |
|---|---|---|
| EP | 288739 A1 | 6/2015 |
| JP | 1138780 A | 5/1992 |

(Continued)

*Primary Examiner* — Gary F Paumen
(74) *Attorney, Agent, or Firm* — The Webb Law Firm

(57) ABSTRACT

Provided is a battery connector assembly that allows adaptation of a connector of a battery to both a connector of an electric work vehicle and a connector of a charger. The assembly includes, in a connector assembly box, a battery connecting connector removably connected to a battery side connector having a plurality of terminals to be connected to the battery a vehicle connecting connector removably connected to a vehicle side connector having a plurality of terminals to be connected to the electric work vehicle and a charger connecting connector removably connected to a charger side connector provided in a charger for charging power supplied from an external power source to the battery and having a plurality of terminals.

5 Claims, 3 Drawing Sheets

(56) References Cited

U.S. PATENT DOCUMENTS

| | | | | |
|---|---|---|---|---|
| 2006/0059880 A1* | 3/2006 | Angott | ............... | A01D 34/008 56/10.2 A |
| 2006/0090439 A1* | 5/2006 | Anderson | ............. | A01D 34/47 56/10.2 G |
| 2007/0080663 A1 | 4/2007 | Obering | | |
| 2008/0098703 A1* | 5/2008 | Lucas | ............... | A01D 69/025 56/11.9 |
| 2009/0266042 A1* | 10/2009 | Mooney | ............... | A01D 34/78 56/11.9 |
| 2009/0296442 A1* | 12/2009 | Chang | ............... | H02J 7/342 363/142 |
| 2010/0162674 A1* | 7/2010 | Eaton | ............... | A01D 34/828 56/10.5 |
| 2010/0240238 A1* | 9/2010 | Hattori | ............. | H01R 13/5213 439/135 |
| 2011/0285358 A1* | 11/2011 | Grant | ............... | F02N 11/0862 320/150 |
| 2012/0104991 A1* | 5/2012 | Suzuki | ............... | H02J 7/0045 320/103 |
| 2013/0130552 A1* | 5/2013 | Ota | ............... | H01M 10/425 439/620.21 |

FOREIGN PATENT DOCUMENTS

| | | | |
|---|---|---|---|
| JP | 201841818 A | 3/2018 | |
| WO | 03018347 A1 | 3/2003 | |
| WO | 2014024227 A1 | 2/2014 | |

* cited by examiner

BATTERY CONNECTOR ASSEMBLY AND BATTERY DEVICE

CROSS-REFERENCE TO RELATED APPLICATION

This application claims priority to Japanese Patent Application No. 2018-145739 filed Aug. 2, 2018, the disclosure of which is hereby incorporated by reference in its entirety.

TECHNICAL FIELD

This invention relates to a battery connector assembly having a connector connectable to a battery. The invention relates also to a battery device having such assembly.

BACKGROUND ART

Patent Document 1 discloses an electric lawnmower mounting a battery thereon. With an electric work vehicle like this electric lawnmower, a wheel driving motor, etc. are operated by power supplied from the mounted battery.

Background Art Document

[Patent Document 1] Japanese Unexamined Patent Application Publication No. 2018-041818

SUMMARY OF THE INVENTION

Problem to be Solved by Invention

A stored electric power amount of the battery required in an electric work vehicle, i.e. a driving-possible period of the electric work vehicle, is greater (longer) for business use which requires a work for a long period of time than for general consumer use. However, in reality, it is difficult in the respects of cost and size to mount a large capacity battery needed for business use. For this reason, it is more realistic to configure the battery to be mounted on an electric work vehicle as a replaceable type battery and to replace this battery when needed.

When such replaceable battery is to be mounted on an electric work vehicle, a battery side connector included in the battery and a vehicle side connector included in the electric work vehicle are connected to each other; and via these connectors, electric power is supplied from the battery to the electric work vehicle. Further, when the replaceable battery is dismounted from the electric work vehicle for charging, the battery side connector included in the battery is connected to a charger side connector included in a charger, so that via these connectors, electric power is supplied from the charger to the battery. Namely, when a replaceable type battery is employed, it is required for this battery to be connectable to the electric work vehicle and also to be connectable to the charger when the battery is dismounted from the electric work vehicle.

However, the power supplied from the battery to the electric work vehicle when the battery is mounted on the electric work vehicle differs in e.g. an appropriate current and/or voltage thereof from the power supplied from the charger to the battery when the battery is dismounted from the electric work vehicle. In such case, the arrangement or configuration (shape, size, number, position, etc.) of terminals of the vehicle side connector of the electric work vehicle may differ from the arrangement or configuration (shape, size, number, position, etc.) of terminals of the charger side connector of the charger. Namely, when a replaceable type battery is to be employed, there is the problem that the battery side connector of the battery must comply with both the vehicle side connector of the electric work vehicle and the charger side connector of the charger that have mutually different terminal arrangements.

Or, even when the terminal arrangement of the vehicle side connector of the electric work vehicle is same as the terminal arrangement of the charger side connector of the charger, as there is provided only one battery side connector included in the battery, it is not possible to connect the electric work vehicle and the charger to the battery simultaneously. For instance, if the charger can be connected to the battery when this battery and the electric work vehicle are already connected to each other with mounting of the battery on the electric work vehicle, charging to the battery will be possible with keeping the battery mounted on the electric work vehicle. However, when there is only one battery side connector provided in the battery, this is not possible.

The present invention has been made in view of the above-described problem and its object is to provide a battery connector assembly that allows adaptation of a connector of a battery, i.e. "a battery side connector", to both a connector of the electric work vehicle (i.e. "a vehicle side connector") and a connector of a charger (i.e. "a charger side connector") and to provide a battery device including such battery connector assembly.

Solutions

An inventive battery connector assembly comprises, in a connector assembly box, a battery connecting connector to be removably connected to a battery side connector provided in a battery and having a plurality of terminals;

a vehicle connecting connector to be removably connected to a vehicle side connector provided in an electric work vehicle and having a plurality of terminals; and a charger connecting connector to be removably connected to a charger side connector provided in a charger for charging power supplied from an external power source to the battery and having a plurality of terminals.

With the present invention, the battery connector assembly can be connected to a battery via a battery connecting connector included in this assembly per se. Further, the battery connector assembly can be connected to an electric work vehicle via a vehicle connecting connector also included in the assembly per se. Moreover, the battery connector assembly can be connected to a charger via a charger connecting connector also included in the assembly per se. Namely, it is possible to adapt the battery side connector included in the battery to both the connectors of the electric work vehicle and the charger via the inventive battery connector assembly. Further, it is also possible to connect the battery to both the electric work vehicle and the charger simultaneously, via the inventive battery connector assembly.

The present invention is useful also in case the arrangement of a plurality of terminals included in the charger connecting connector is different from the arrangement of a plurality of terminals included in the vehicle connecting connector. Namely, even when the arrangement of the plurality of terminals included in the battery side connector provided in the battery differed from the arrangement of the plurality of terminals included in the charger connecting connector and/or the arrangement of the plurality of terminals included in the vehicle connecting connector, by connecting the inventive battery connector assembly with the battery side connector included in the battery, it becomes possible to adapt the battery side connector included in the battery to both the connector of the electric work vehicle and the connector of the charger, via the battery connector assembly.

In the present invention, preferably, the connector assembly box includes a charger side protector cap connectable to the charger connecting connector when the charger side connector is not connected to the charger connecting connector and a vehicle side protector cap connectable to the vehicle connecting connector when the vehicle side connector is not connected to the vehicle connecting connector.

With the present invention, it is possible to protect the charger connecting connector by the charger side protector cap and to protect the vehicle connecting connector by the vehicle side protector cap, against foreign substance such as water, dust, etc.

In the present invention, preferably, the battery connector assembly further comprises:

a remaining capacity displaying section capable of displaying information indicative of a remaining capacity of the battery;

an instruction receiving section for receiving, from a user, a displaying instruction for the information indicative of the remaining capacity of the battery; and a display controlling section for acquiring the information relating to the remaining capacity of the battery connected to the battery connecting connector and then causing the remaining capacity displaying section to display the information indicative of the remaining capacity of the battery when the instruction receiving section receives the displaying instruction.

With the present invention, when the instruction receiving section receives from a user a displaying instruction for the information indicative of the remaining capacity of the battery, the display controlling section will obtain information relating a remaining capacity of the battery connected to the battery connecting container and causes the remaining capacity displaying section to display this information indicative of the remaining capacity of the battery. Namely, the battery connector assembly can provide the function of allowing the user to visually confirm the information indicative of the remaining capacity of the battery.

A battery device relating also to the present invention comprises the above-described battery connector assembly and the above-described battery.

With the present invention, the battery device comprising the above-described battery connector assembly and the above-described battery can be connected to a vehicle side battery when the device is mounted on an electric work vehicle, so that power can be supplied from the battery to the electric work vehicle. Further, the battery device comprising the above-described battery connector assembly and the above-described battery can be connected to a charger side connector when the battery device is dismounted from the electric work vehicle, so that power can be supplied from the charger to the battery.

DETAILED DESCRIPTION

Figure 1:
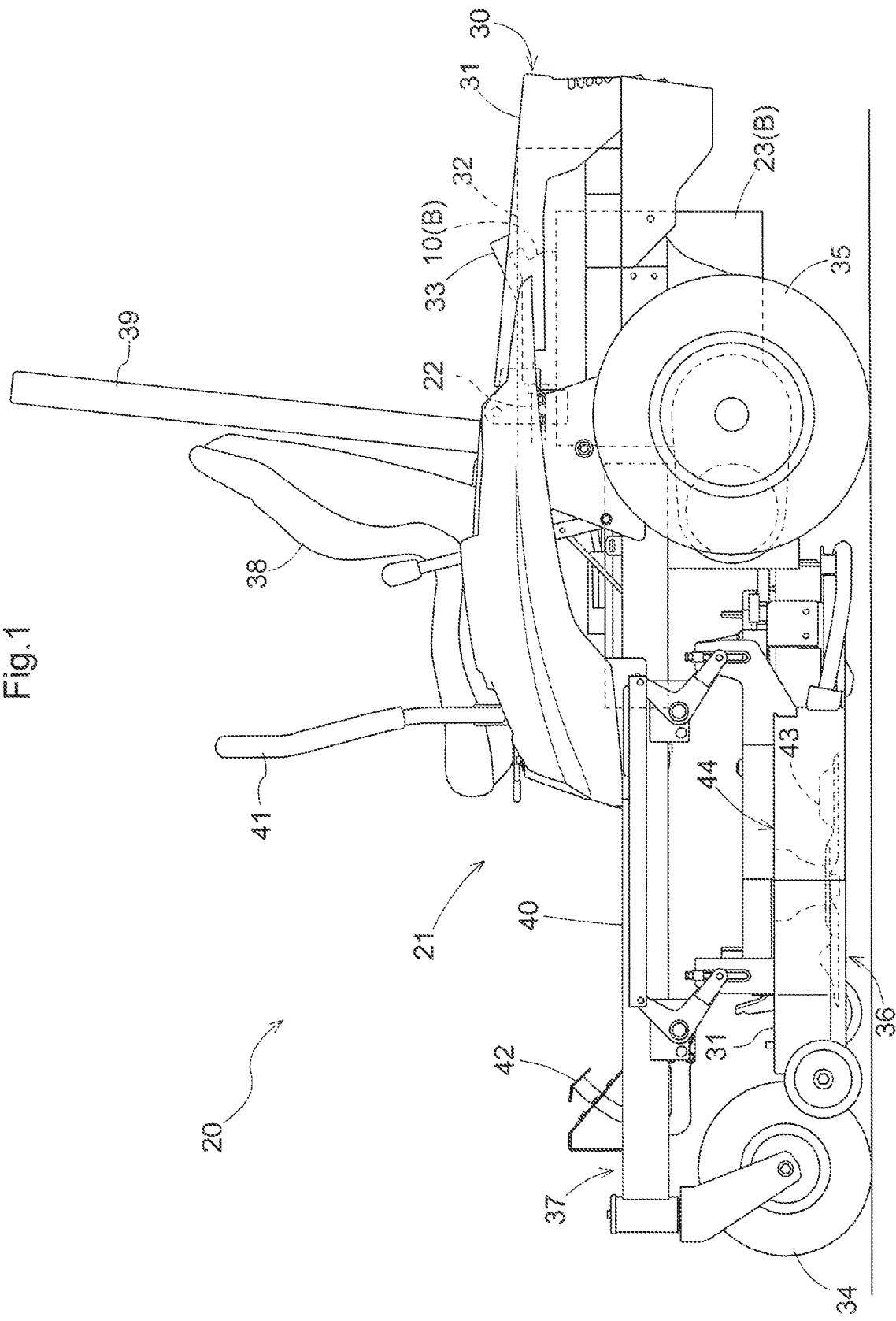
FIG. 1 is a side view of an electric work vehicle.

Next, there will be explained a battery connector assembly 10 and a battery device B both relating to embodiments of the present invention, with reference to the accompanying drawings. FIG. 1 is a side view of an electric work vehicle 20. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

This electric work vehicle 20 includes a front wheel unit 34 consisting of a left front wheel and a right front wheel, a rear wheel unit 35 consisting of a left rear wheel and a right rear wheel, a vehicle body frame 37 supported by the front wheel unit 34 and the rear wheel unit 35, a battery 23 disposed at a rear portion of the vehicle body frame 37, a driver's seat 38 disposed forwardly of the battery 23, a ROPS frame 39 mounted vertically from the rear side of the driver's seat 38, and a mower unit 36 provided at a space beneath the vehicle body frame 37 between the front wheel unit 34 and the rear wheel unit 35 and suspended from the vehicle body frame 37 to be liftable up/down.

Forwardly of the driver's seat 38, there is provided a floor plate 40 as a "footrest" for a driver, from which a brake lever 42 protrudes. On the opposed sides of the driver's seat 38, there are provided maneuvering levers 41 consisting of a left maneuvering lever and a right maneuvering lever which are pivotable about a horizontal pivot axis extending in the vehicle body transverse direction.

The mower unit 36 includes a mower deck 44 and two rotary mower blades 43 disposed in the inside space of the mower deck 44. Each mower blade 43 is rotatably driven by a mower motor (not shown). For instance, the mower blade 43 can be a band plate-like member, with cutting blade edges being formed at its opposed ends. Further, rearwardly of the cutting blade edge, a wind generator vane is formed. At time of a grass mowing work, the electric work vehicle 20 travels with the mower blades 43 being rotated, whereby mowed grass clippings mowed by the mower blades 43 will be guided by the conveying wind generated by the wind generating vanes of the blades 43 to a baffle plate provided inside the mower deck 44 to pass through the inside of the mower deck 44 and to be eventually discharged to the lateral outer side of the mower deck 44 via a grass clipping discharge opening (not shown).

The electric work vehicle 20 is provided with a vehicle side connector 22. Via this vehicle side connector 22, electric power is supplied to an electric work vehicle body 21. For example, in the electric work vehicle 20, power of the battery 23 is supplied to the electric work vehicle body 21 having electric motors (not shown) for rotatably driving the front wheel unit 34 and the rear wheel unit 35 respectively, and a mower motor (not shown) for rotatably driving the mower blades 43, etc.

Figure 2:
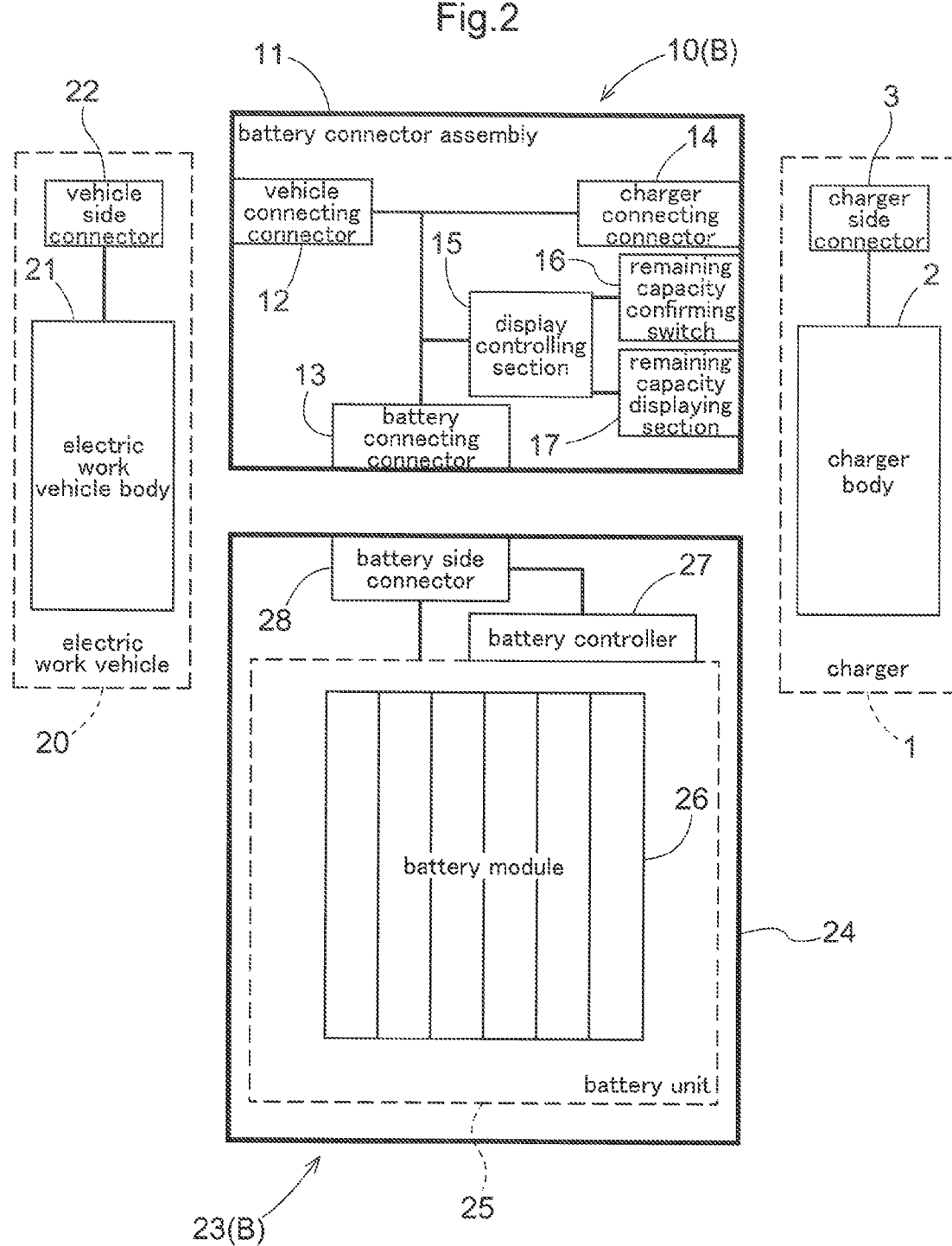
FIG. 2 is a functional block diagram of the electric work vehicle, a battery, a battery connector assembly and a charger.
Figure 3:
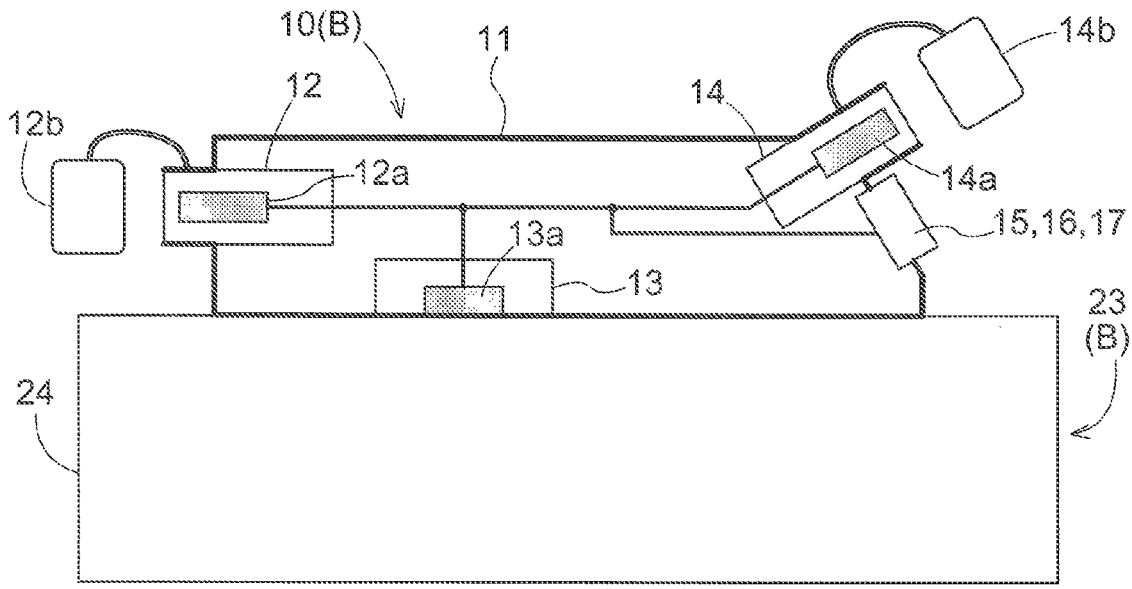
FIG. 3 is an explanatory view for explaining an arrangement of the battery connector assembly.
Figure 4:
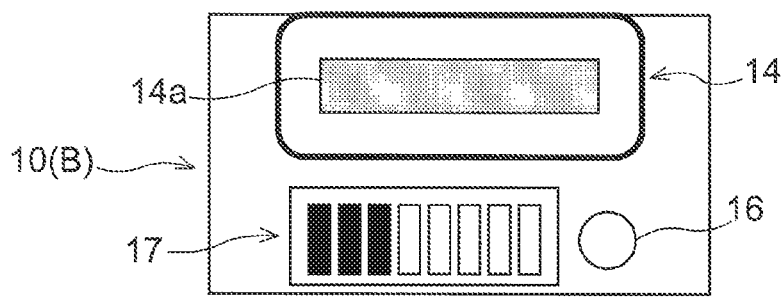
FIG. 4 is a view for explaining an arrangement around a charger connecting connector of the battery connector assembly.

FIG. 2 is a functional block diagram of the electric work vehicle 20, the battery 23, the battery connector assembly 10 and the charger 1. FIG. 3 is a view for explaining the arrangement of the battery connector assembly 10. FIG. 4 is a view for explaining an arrangement around a charger connecting connector 14 of the battery connector assembly 10.

The battery 23 is configured such that a battery unit 25 comprised of a plurality of battery modules 26 is accommodated inside a battery case 24 having dust proof property, water proof property, etc. The battery modules 26 are connected to a battery side connector 28. Via this battery side connector 28, power charging to the battery modules 26 and power discharging from the battery modules 26 to the outside are effected. With provision of the plurality of battery modules 26 therein, the battery unit 25 can store an amount of electric power sufficient for enabling traveling and a grass mowing work.

Though not shown, temperatures of the battery modules 26 and the remaining capacity of the battery unit 25 as a whole, etc. will be determined and the results of these determinations will be transmitted to a battery controller 27. The battery controller 27 can communicate with the outside of the battery 23 via the battery side connector 28 and can transmit the information handled by the battery controller 27 including the above-described temperatures, the remaining capacity, etc. to the outside via the battery side connector 28.

As shown in FIG. 1, the battery 23 is mounted on the electric work vehicle 20, with the battery 23 being covered by a rear opening type battery cover 30 which is vertically pivotally supported to the vehicle body frame 37. The battery cover 30 includes a first cover member 31 that covers the rear side of the battery 23, a second cover member 32 that covers the upper side of the battery 23 and a third cover member 33 provided for the second cover member 32. The first cover member 31, the second cover member 32 and the third cover member 33 which together constitute the battery cover 30 are pivotable altogether between a lower closed position and an upper opened position. More particularly, when the battery cover 30 is pivoted to the upper opened position, the mounted battery device B (the battery 23 and the battery connector assembly 10) is exposed, thus allowing e.g. dismounting of the battery device B from the electric work vehicle 20.

The charger 1 includes a charger side connector 3 and a charger body 2 comprised of other components, etc. The charger body 2 converts electric power supplied from e.g. a commercial power supply to a predetermined voltage and current and outputs the converted power to the battery connector assembly 10 via the charger side connector 3.

The battery connector assembly 10 includes, in a connector assembly box 11, a battery connecting connector 13, a vehicle connecting connector 12 and a charger connecting connector 14. The battery connecting connector 13 of the battery connector assembly 10 is to be connected to the battery side connector 28 of the battery 23, so that these battery connector assembly 10 and battery 23 can together constitute the battery device B. And, the battery device B as a whole will be mounted to the electric work vehicle 20 or dismounted from the electric work vehicle 20.

The battery connecting connector 13 has a plurality of terminals 13a to be connected to wires (or bus bars) for giving/receiving power and wires for signal transmission for the above-described temperature information, remaining capacity information, etc. that are provided inside the connector assembly box 11. And, this battery connecting connector 13 is configured to be able to be detachably connected to the battery side connector 28 having a plurality of terminals (not shown) and provided in the battery 23.

The vehicle connecting connector 12 has a plurality of terminals 12a to be connected to wires (or bus bars) that are provided for giving/receiving power inside the connector assembly box 11. And, this vehicle connecting connector 12 is configured to be able to be detachably connected to the vehicle side connector 22 having a plurality of terminals (not shown) and provided in the electric work vehicle 20. In this case, as the vehicle connecting connector 12 for establishing electric connection with the electric work vehicle 20, a connector suitable to a current and a voltage of the electric power supplied from the battery 23 to the electric work vehicle 20 can be employed advantageously.

The charger connecting connector 14 has a plurality of terminals 14a to be connected to wires (or bus bars) that are provided for giving/receiving power inside the connector assembly box 11. And, this charger connecting connector 14 is configured to be able to be detachably connected to the charger side connector 3 included in the charger 1 for charging the battery 23 with the electric power supplied from the external power source and having a plurality of terminals (not shown). In this case, as the charger connecting connector 14 for establishing electric connection with the charger 1, a connector suitable to a current and a voltage of the electric power supplied from the charger 1 to the battery 23 can be employed advantageously.

In case the battery device B (the battery connector assembly 10 and the battery 23) is to be mounted to the electric work vehicle 20, the battery connecting connector 13 of the battery connector assembly 10 will be connected to the battery side connector 28 of the battery 23 and the vehicle connecting connector 12 of the battery connector assembly 10 will be connected to the vehicle side connector 22 of the electric work vehicle 20, and the power stored in the battery modules 26 of the battery 23 will be supplied to the electric work vehicle 20.

In case the battery device B is to be dismounted from the electric work vehicle 20 and then to be connected to the charger 1, the battery connecting connector 13 of the battery connector assembly 10 will be connected to the battery side connector 28 of the battery 23 and the charger connecting connector 14 of the battery connector assembly 10 will be connected to the charger side connector 3 of the charger 1, and the power supplied from the charger 1 will be supplied to the battery modules 26 of the battery 23.

In this way, the battery connector assembly 10 according to the instant embodiment can be connected to the battery 23 via the battery connecting connector 13 included in this assembly 10 per se and can be connected to the electric work vehicle 20 via the vehicle connecting connector 12 also included in this assembly 10 per se and can also be connected to the charger 1 via the charger connecting connector 14 also included in this assembly 10 per se. Namely, via this battery connector assembly 10, the battery side connector 28 included in the battery 23 can be adapted to both the connectors (i.e. the vehicle side connector 22 and the charger side connector 3) of the electric work vehicle 20 and of the charger 1. Moreover, via this battery connector assembly 10, the battery 23 can be connected to the electric work vehicle 20 and to the charger 1 simultaneously as well.

In the instant embodiment, the maximum current of the electric power supplied from the battery 23 to the electric work vehicle 20 differs from the maximum current of the electric power supplied from the charger 1 to the battery 23. So, the capacity required from the charger connecting connector 14 used in the connection between the battery 23 and the charger 1 differs from the capacity required from the vehicle connecting connector 12 used in the connection between the battery 23 and the electric work vehicle 20. For this reason, the arrangement (or configuration) (shape, size, number, position, etc.) of the plurality of terminals 14a included in the charger connecting connector 14 used in the connection between the battery 23 and the charger 1 is different from the arrangement (or configuration) (shape, size, number, position, etc.) of the plurality of terminals 12a included in the vehicle connecting connector 12 used in the connection between the battery 23 and the electric work vehicle 20. Even in such case, by connecting the battery connector assembly 10 of this embodiment to the battery side connector 28 included in the battery 23, it becomes possible to adapt this battery side connector 28 included in the battery 23 to the both connectors of the electric work vehicle 20 and the charger 1 via this battery connector assembly 10.

Also, the connector assembly box 11 includes a charger side protector cap 14b connectable to the charger connecting connector 14 when the charger side connector 3 is not connected to this charger connecting connector 14 and a vehicle side protector cap 12b connectable to the vehicle connecting connector 12 when the vehicle side connector 22 is not connected to the vehicle connecting connector 12. In case the battery device B is mounted to the electric work vehicle 20, the charger side protector cap 14b will be connected to the charger connecting connector 14 to which nothing is connected, whereby the plurality of terminals 14a included in the charger connecting connector 14 can be protected against intrusion of foreign substance, such as water, dust, etc.

Similarly, when the battery device B is dismounted from the electric work vehicle 20 and connected to the charger 1, the vehicle side protector cap 12b will be connected to the vehicle connecting connector 12 to which nothing is connected, whereby the plurality of terminals 12a included in the vehicle connecting connector 12 can be protected against intrusion of water, foreign substance, etc.

Further, when the battery device B is dismounted from the electric work vehicle 20 and this battery device B alone is to be stored or transported, by connecting the vehicle side protector cap 12b to the vehicle connecting connector 12 to which nothing is connected and connecting the charger side protector cap 14b to the charger connecting connector 14 to which nothing is connected, both the plurality of terminals 12a included in the vehicle connecting connector 12 and the plurality of terminals 14a included in the charger connecting connector 14 can be protected against intrusion of water, foreign substance, etc.

The battery controller 27 of the battery 23 is connected to a display controlling section 15 of the battery connector assembly 10 via the battery side connector 28 of the battery 23 and the battery connector assembly 10. The display controlling section 15 is connected to a remaining capacity displaying section 17 capable of displaying information indicative of the remaining capacity of the battery 23. Thus, the display controlling section 15 can acquire information relating to the remaining capacity of the battery 23 connected to the battery connecting connector 13 and then cause the remaining capacity displaying section 17 to display the information indicative of the remaining capacity of this battery 23. In the instant embodiment, in the battery connector assembly 10, there is provided also a remaining capacity confirming switch 16 as an "instruction receiving section" for receiving from a user a displaying instruction for the information indicative of the remaining capacity of the battery 23. And, when the remaining capacity confirming switch 16 receives a displaying instruction, the display controlling section 15 acquires the information relating to the remaining capacity of the battery 23 connected to the battery connecting connector 13 and cause the remaining capacity displaying section 17 to display the information indicative of the remaining capacity of this battery 23.

FIG. 4 is a view showing examples of shapes of the charger connecting connector 14, the remaining capacity displaying section 17 and the remaining capacity confirming switch 16. As shown, the remaining capacity displaying section 17 is constituted of using a plurality of lamp portions (e.g. LED's, etc.) which are switched between lighting and extinction. Beside the remaining capacity displaying section 17, the remaining capacity confirming switch 16 configured as a push-button type is provided. And, when the remaining capacity confirming switch 16 is pushed, the display controlling section 15 will cause lighting of lamps of a number corresponding to the level of remaining capacity of the battery 23 for a predetermined period, thus allowing the user to visually recognize the level of the remaining capacity of the battery 23.

Figure 5:
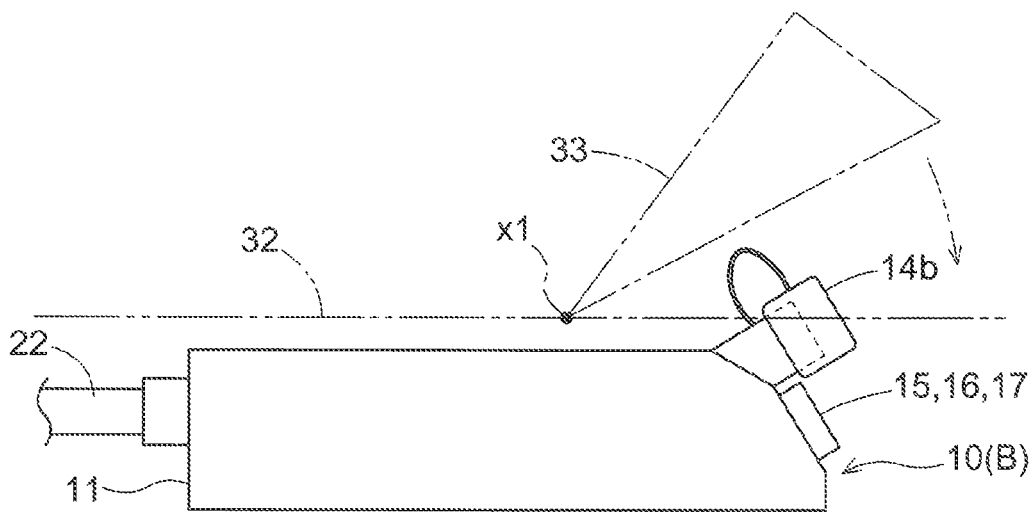
FIG. 5 is a view for explaining an arrangement of a battery cover.

FIG. 5 is a view for explaining the arrangement of the battery cover 30.

In case the battery device B is mounted on the electric work vehicle 20, the upper side of this battery device B including the battery connector assembly 10 is covered by the battery cover 30. In particular, the upper side of the remaining capacity displaying section 17 and the remaining capacity confirming switch 16 are covered by the third cover member 33 which is movable. This third cover member 33 is provided for the second cover member 32 and the third cover member 33 can be pivoted to be opened on the second cover member 32 about a pivot axis x1. With the provision of such movable type third cover member 33, the user, if necessary, can open the third cover member 33 with the battery device B being kept mounted on the electric work vehicle 20 and then connect the charger side connector 3 of the charger 1 to the battery connector assembly 10 of the battery device B. Further, the user can also open the third cover member 33 with the battery device B being kept mounted on the electric work vehicle 20 and then push the remaining capacity confirming switch 16 to confirm the remaining capacity of the battery 23.

Other Embodiments

<1> In the foregoing embodiment, there was explained, as an example, the inventive battery connector assembly 10 and the battery device B having this assembly. However, the arrangements thereof can be modified if appropriate.

For instance, the shape or the like of the connector assembly box 11 of the battery connector assembly 10 can be changed appropriately.

Further, in the foregoing embodiment, there was explained an example in which the battery connector assembly 10 is provided upwardly of the battery 23. However, the disposing position of the battery connector assembly 10 relative to the battery 23 can be appropriately changed, e.g. disposing the battery connector assembly 10 on the lateral side of the battery 23, etc.

Further alternatively, the plurality of lamp portions constituting the remaining capacity displaying section 17 can be realized with using various kinds of display devices such as liquid crystal displays, etc.

<2> In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the object of the invention.

INDUSTRIAL APPLICABILITY

The present invention is applicable to a battery connector assembly capable of adapting a connector of a battery with both connectors of an electric work vehicle and of a charger and applicable also to a battery device having such battery connector assembly.

DESCRIPTION OF SIGNS

1: charger
3: charger side connector
10: battery connector assembly
11: connector assembly box
12: vehicle connecting connector
12a: terminals
12b: vehicle side protector cap
13: battery connecting connector
13a: terminals
14: charger connecting connector
14a: terminals
14b: charger side protector cap
15: display controlling section
16: remaining capacity confirming switch (instruction receiving section)
17: remaining capacity displaying section
22: vehicle side connector
23: battery
28: battery side connector
B: battery device

The invention claimed is:

1. A battery connector assembly comprising, in a connector assembly box:
a battery connecting connector to be removably connected to a battery side connector provided in a battery and having a plurality of terminals;
a vehicle connecting connector to be removably connected to a vehicle side connector provided in an electric work vehicle and having a plurality of terminals;
a charger connecting connector to be removably connected to a charger side connector provided in a charger for charging power supplied from an external power source to the battery and having a plurality of terminals;
a remaining capacity displaying section capable of displaying information indicative of a remaining capacity of the battery;
an instruction receiving section for receiving, from a user, a displaying instruction for the information indicative of the remaining capacity of the battery; and
a display controlling section for acquiring the information relating to the remaining capacity of the battery connected to the battery connecting connector and then causing the remaining capacity displaying section to display the information indicative of the remaining capacity of the battery when the instruction receiving section receives the displaying instruction,
wherein the battery can be connected to the electric work vehicle, so that electric power is supplied from the battery to the electric work vehicle, and at the same time to the charger, so that electric power is supplied from the charger to the battery.

2. The battery connector assembly of claim 1, wherein the arrangement of a plurality of terminals included in the charger connecting connector is different from the arrangement of a plurality of terminals included in the vehicle connecting connector.

3. The battery connector assembly of claim 1, wherein:
the connector assembly box includes:
a charger side protector cap connectable to the charger connecting connector when the charger side connector is not connected to the charger connecting connector; and
a vehicle side protector cap connectable to the vehicle connecting connector when the vehicle side connector is not connected to the vehicle connecting connector.

4. A battery device comprising the battery connector assembly and the battery of claim 1.

5. A vehicle driving system comprising:
a battery;
an electric work vehicle;
a charger for charging power supplied from an external power source to the battery; and
a battery connector assembly,
wherein the battery connector assembly comprises, in a connector assembly box:
a battery connecting connector to be removably connected to a battery side connector provided in the battery and having a plurality of terminals;
a vehicle connecting connector to be removably connected to a vehicle side connector provided in the electric work vehicle and having a plurality of terminals; and
a charger connecting connector to be removably connected to a charger side connector provided in the charger and having a plurality of terminals, and
wherein the battery can be connected to the electric work vehicle so that electric power is supplied from the battery to the electric work vehicle, and at the same time to the charger so that electric power is supplied from the charger to the battery.

* * * * *

UNITED STATES PATENT AND TRADEMARK OFFICE
CERTIFICATE OF CORRECTION

Page 1 of 1

PATENT NO. : 11,258,218 B2
APPLICATION NO. : 16/434331
DATED : February 22, 2022
INVENTOR(S) : Uemura et al.

It is certified that error appears in the above-identified patent and that said Letters Patent is hereby corrected as shown below:

On the Title Page

Column 2, item (56) Foreign Patent Documents, Line 2, delete "1138780" and insert --4138780--

Signed and Sealed this
Twelfth Day of April, 2022

Drew Hirshfeld
*Performing the Functions and Duties of the
Under Secretary of Commerce for Intellectual Property and
Director of the United States Patent and Trademark Office*